United States Patent
Horowitz et al.

(10) Patent No.: US 11,669,759 B2
(45) Date of Patent: *Jun. 6, 2023

(54) ENTITY RESOURCE RECOMMENDATION SYSTEM BASED ON INTERACTION VECTORIZATION

(71) Applicant: BANK OF AMERICA CORPORATION, Charlotte, NC (US)

(72) Inventors: Justin Ryan Horowitz, Huntersville, NC (US); Andrew Yardley Vlasic, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1112 days.

This patent is subject to a terminal disclaimer.

(21) Appl. No.: 16/190,950

(22) Filed: Nov. 14, 2018

(65) Prior Publication Data
US 2020/0151597 A1  May 14, 2020

(51) Int. Cl.
*G06N 7/00* (2023.01)
*G06F 17/16* (2006.01)
*G06N 5/00* (2023.01)

(52) U.S. Cl.
CPC ............... *G06N 7/00* (2013.01); *G06F 17/16* (2013.01); *G06N 5/00* (2013.01)

(58) Field of Classification Search
CPC . G06N 7/00; G06N 20/00; G06N 5/00; G06F 17/16
See application file for complete search history.

(56) References Cited

U.S. PATENT DOCUMENTS

| | | |
|---|---|---|
| 7,672,833 B2 | 3/2010 | Blume et al. |
| 8,965,762 B2 | 6/2011 | Song |
| 8,117,199 B2 | 2/2012 | Ghani et al. |
| 8,942,986 B2 | 5/2013 | Cheyer |

(Continued)

FOREIGN PATENT DOCUMENTS

| | | | |
|---|---|---|---|
| CN | 104809107 A | * | 7/2015 |
| WO | WO-2018212710 A1 | * | 11/2018 |

OTHER PUBLICATIONS

He et al., "NAIS: Neural Attentive Item Similarity Model for Recommendation" Sep. 19, 2018, arXiv: 1809.07053v1, pp. 1-13. (Year: 2018).*

(Continued)

*Primary Examiner* — Miranda M Huang
*Assistant Examiner* — Chase P. Hinckley
(74) *Attorney, Agent, or Firm* — Moore & Van Allen PLLC; Jeffrey R. Gray

(57) ABSTRACT

An interaction prediction system for accurately predicting the occurrence of interactions, entities associated with the interactions, and/or resources involved with the interactions. The interaction predictions can be used for a number of different purposes, such as improving security of systems, predicting future interactions or the likelihood thereof, or the like. The interaction prediction system described herein more accurately predict the interactions using modeling and monitoring that increases the processing speeds by reducing the data needed to make the predictions, reduces the memory requirements to make the predictions, and increases the capacity of the processing systems when compared to traditional systems.

18 Claims, 3 Drawing Sheets

(56) References Cited

U.S. PATENT DOCUMENTS

| | | | |
|---|---|---|---|
| 8,589,285 | B2 | 11/2013 | Monk |
| 8,626,663 | B2 | 1/2014 | Nightengale et al. |
| 8,655,646 | B2 | 2/2014 | Lee et al. |
| 9,613,004 | B2 | 5/2014 | Liang |
| 10,187,399 | B2 | 1/2019 | Katz |
| 10,402,406 | B2 | 9/2019 | Troisvallets et al. |
| 10,467,631 | B2 | 11/2019 | Dhurandhar et al. |
| 11,004,135 | B1* | 5/2021 | Sandler .............. G06Q 30/0631 |
| 2003/0069820 | A1 | 4/2003 | Hillmer et al. |
| 2003/0167265 | A1 | 9/2003 | Corynen |
| 2008/0235216 | A1 | 9/2008 | Ruttenberg |
| 2009/0089317 | A1 | 4/2009 | Ford et al. |
| 2010/0274720 | A1 | 10/2010 | Carlson et al. |
| 2012/0158586 | A1 | 6/2012 | Ganti et al. |
| 2012/0221485 | A1 | 8/2012 | Leidner et al. |
| 2013/0282562 | A1 | 10/2013 | Gallo et al. |
| 2014/0012738 | A1 | 1/2014 | Woo |
| 2015/0026027 | A1 | 1/2015 | Priess et al. |
| 2015/0242856 | A1 | 8/2015 | Dhurandhar et al. |
| 2016/0012088 | A1* | 1/2016 | Rossi ................... G06Q 30/02 707/736 |
| 2016/0012544 | A1 | 1/2016 | Ramaswamy et al. |
| 2016/0021135 | A1 | 1/2016 | Chesla et al. |
| 2016/0086185 | A1 | 3/2016 | Adjaoute |
| 2018/0068232 | A1* | 3/2018 | Hari Haran ........... G06F 3/0482 |
| 2018/0075512 | A1* | 3/2018 | Bui .................... G06Q 30/0631 |
| 2018/0225449 | A1 | 8/2018 | Byrne et al. |
| 2019/0114687 | A1* | 4/2019 | Krishnamurthy ... G06F 16/9535 |
| 2019/0172089 | A1 | 6/2019 | Tang et al. |
| 2019/0220909 | A1* | 7/2019 | Sahoo ................ G06F 16/9535 |
| 2019/0325293 | A1* | 10/2019 | Wang ..................... G06N 5/003 |
| 2019/0325514 | A1* | 10/2019 | Hong ................... G06N 3/0454 |
| 2019/0362220 | A1* | 11/2019 | Yap ..................... G06N 3/0454 |
| 2020/0045049 | A1 | 2/2020 | Apostolopoulos et al. |
| 2020/0074324 | A1* | 3/2020 | Wu .......................... G06N 5/04 |
| 2020/0110783 | A1* | 4/2020 | Ushanov ................ G06N 20/00 |
| 2020/0118204 | A1* | 4/2020 | Chakraborty ........ G06Q 20/405 |
| 2021/0272217 | A1* | 9/2021 | Shu ........................ G06N 5/022 |
| 2021/0374027 | A1 | 12/2021 | Joglekar et al. |

OTHER PUBLICATIONS

He et al., "Outer Product-based Neural Collaborative Filtering" Aug. 12, 2018, arXiv: 1808.03912v1, pp. 1-7. (Year: 2018).*

Mei et al., "An attentive Interaction Network for Context-aware Recommendations" Oct. 2018, pp. 157-166. (Year: 2018).*

Lian et al., "xDeepFM: Combining Explicit and Implicit Feature Interactions for Recommender Systems" May 30, 2018, arXiv: 1803.05170v3, pp. 1-10. (Year: 2018).*

Hu et al., "Leveraging Meta-path based Context for Top-N Recommendation with a Neural Co-Attention Model" Aug. 2018, pp. 1531-1540. (Year: 2018).*

Song et al., "AutoInt: Automatic Feature Interaction Learning via Self-Attentive Neural Networks" Oct. 29, 2018, arXiv: 1810.11921v1. (Year: 2018).*

Sun et al., "Attentive Recurrent Social Recommendation" Jul. 2018, pp. 185-194. (Year: 2018).*

Wang et al., "TEM: Tree-enhanced Embedding Model for Explainable Recommendation" Apr. 2018, pp. 1543-1552. (Year: 2018).*

Xue et al., "Deep Matrix Factorization Models for Recommender Systems" 2017, pp. 3203-3209. (Year: 2017).*

Liu et al., "COT: Contextual Operating Tensor for Context-Aware Recommender Systems" 2015, pp. 203-209. (Year: 2015).*

Manotumruksa et al., "A Deep Recurrent Collaborative Filtering Framework for Venue Recommendation" Nov. 2017, pp. 1429-1438. (Year: 2017).*

Agarwal et al., "Personalizing Similar Product Recommendations in a Fashion E-commerce" Jun. 29, 2018, arXiv: 1806.1137v1, pp. 1-5. (Year: 2018).*

He et al., "Adversarial Personalized Ranking for Recommendation" Jul. 2018, pp. 355-364. (Year: 2018).*

Bharadhwaj et al., "RecGAN: Recurrent Generative Adversarial Networks for Recommendation Systems" Oct. 2018, pp. 372-376. (Year: 2018).*

Cao et al., "Attentive Group Recommendation" Jul. 2018, pp. 645-654. (Year: 2018).*

Vinh et al., "Attention-based Group Recommendation" Apr. 18, 2018, pp. 1-17. (Year: 2018).*

Wu et al., "Neural Tensor Factorization" Feb. 13, 2018. (Year: 2018).*

Yildirim, Soner "Linear Algebra Basics: Dot Product and Matrix Multiplication" Jun. 2020. (Year: 2020).*

Goodfellow et al., "Deep Learning" 2016, pp. i-777. (Year: 2016).*

Feng et al., "Improving Stock Movement Prediction with Adversarial Training" Oct. 13, 2018. (Year: 2018).*

\* cited by examiner

ENTITY RESOURCE RECOMMENDATION SYSTEM BASED ON INTERACTION VECTORIZATION

FIELD

The present invention relates to an interaction predication platform, and more particularly, to an interaction prediction platform that can be used in order to verify interactions in which an entity has entered or may enter in the future.

BACKGROUND

Identifying interactions in which entities have entered or may enter in the future is difficult because entities have different needs and purposes for entering into interactions that change over time. Traditional methods and systems of making these determinations are not accurate, require multiple models for different entities, and/or require large processing and memory requirements. As such, it is difficult to effectively identify authorized interactions or potential interactions that may be entered into in the future. Moreover, traditional methods overburden the systems that an organization uses in trying to improve security and/or predict future interactions.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer implemented methods, and computer products are described herein for an interaction prediction system that more accurately predicts the occurrence of interactions, entities associated with the interactions, and/or resources involved with the interactions. It should be understood that the predictions can be used for a number of different purposes, such as but not limited to, improving security, predicting future interactions or the likelihood thereof, or the like. It should be understood that the improvements to the technical features of the systems related to improving security and predicting future interactions relate to improving the processing speeds of the systems, reducing memory requirements, and increasing the processing capacity because the invention of the present disclosure reduces the amount of data and calculations needed to make the predictions when compared to traditional prediction systems and methods, as will be discussed in further detail herein.

Embodiments of the invention comprise systems, computer implemented methods, and/or computer program products for an interaction prediction system for identifying suggested interactions. The invention comprises identifying a first entity and a second entity for a potential interaction, and identifying estimated interaction resources for the potential interaction based on an interaction equation. The interaction equation comprises $\log_y(X) = \vec{m}_1 * B * \vec{m}_2 + c$; wherein $\vec{m}_1$ is a vector for one entity, $\vec{m}_2$ is a vector for another entity, B is a interaction matrix, c is an interaction amount type constant, and X is the estimated interaction resources for an interaction. The invention further comprises determining a suggested interaction between the first entity and the second entity, and sending a notification to the first entity or the second entity regarding the suggested interaction.

In further accord with embodiments of the invention, a $\vec{m}_n$ vector is determined for each of a plurality of entities, including the first entity and the second entity.

In other embodiments of the invention, the $\vec{m}_n$ vector for each of the plurality of entities and the B interaction matrix is determined by using a one shot fit for the plurality of entities based on historical interactions for the plurality of entities.

In yet other embodiments of the invention, the $\vec{m}_n$ vector for at least one entity of the plurality of entities is updated as the at least one entity enters into new interactions.

In still other embodiments of the invention, the B interaction matrix defines a market in which the plurality of entities are participants.

In further accord with embodiments of the invention, the $\vec{m}_1$ vector and the $\vec{m}_2$ vector are 7×1 or 8×1 vectors.

In other embodiments of the invention, the B interaction matrix is a 7×7 or 8×8 dimensional matrix.

In yet other embodiments of the invention, the B interaction matrix is adjusted based on different locations of the plurality of entities.

In still other embodiments of the invention, the B matrix is adjusted based on time.

In further accord with embodiments of the invention, the suggested interaction between the first entity and the second entity is determined by determining when resources for a product are less than or equal to the estimated interaction resources for the potential interaction.

In other embodiments of the invention, the potential interaction is limited to channel.

In yet other embodiments of the invention, the estimated interaction resources indicate a resource amount at which the first entity would likely enter into an interaction with the second entity.

In still other embodiments, the invention further comprises identifying a plurality of entities for potential interactions with the second entity, identifying the estimated interaction resources for each of the potential interactions based on the interaction equation, and determining a plurality of suggested interactions between the plurality of entities and the second entity when the estimated interaction resources for the plurality of suggested interactions meets thresholds resources for a product of the second entity. Moreover, the notification is sent to the second entity and comprises the suggested interactions for the plurality of entities.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
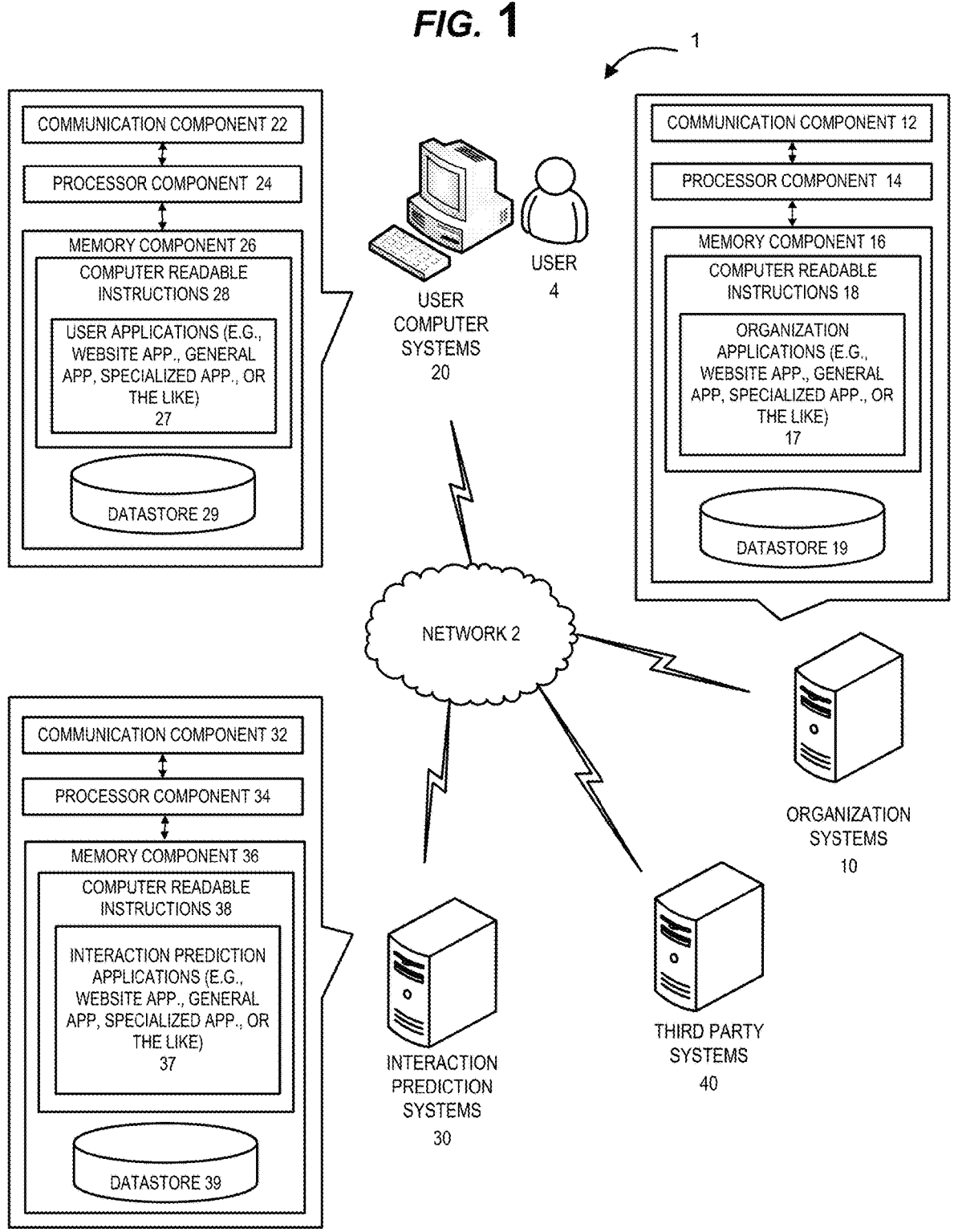

Having thus described embodiments of the invention in general terms, reference will now be made to the accompanying drawings, and wherein:

FIG. 1 illustrates a block diagram of an interaction prediction system environment, in accordance with one or more embodiments of the invention.

Figure 2:
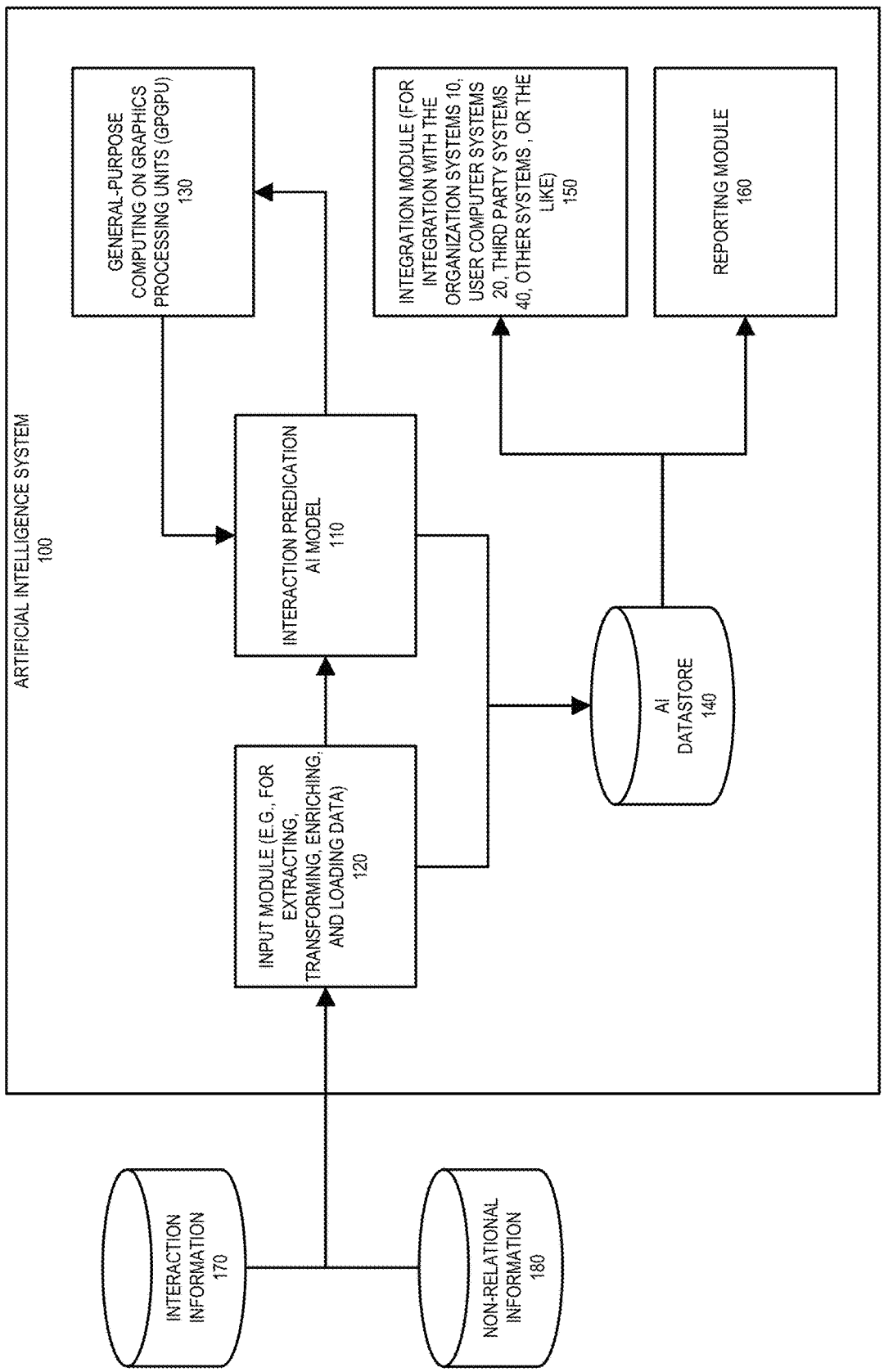

FIG. 2 illustrates an interaction prediction flow diagram, in accordance with one or more embodiments of the invention.

Figure 3:
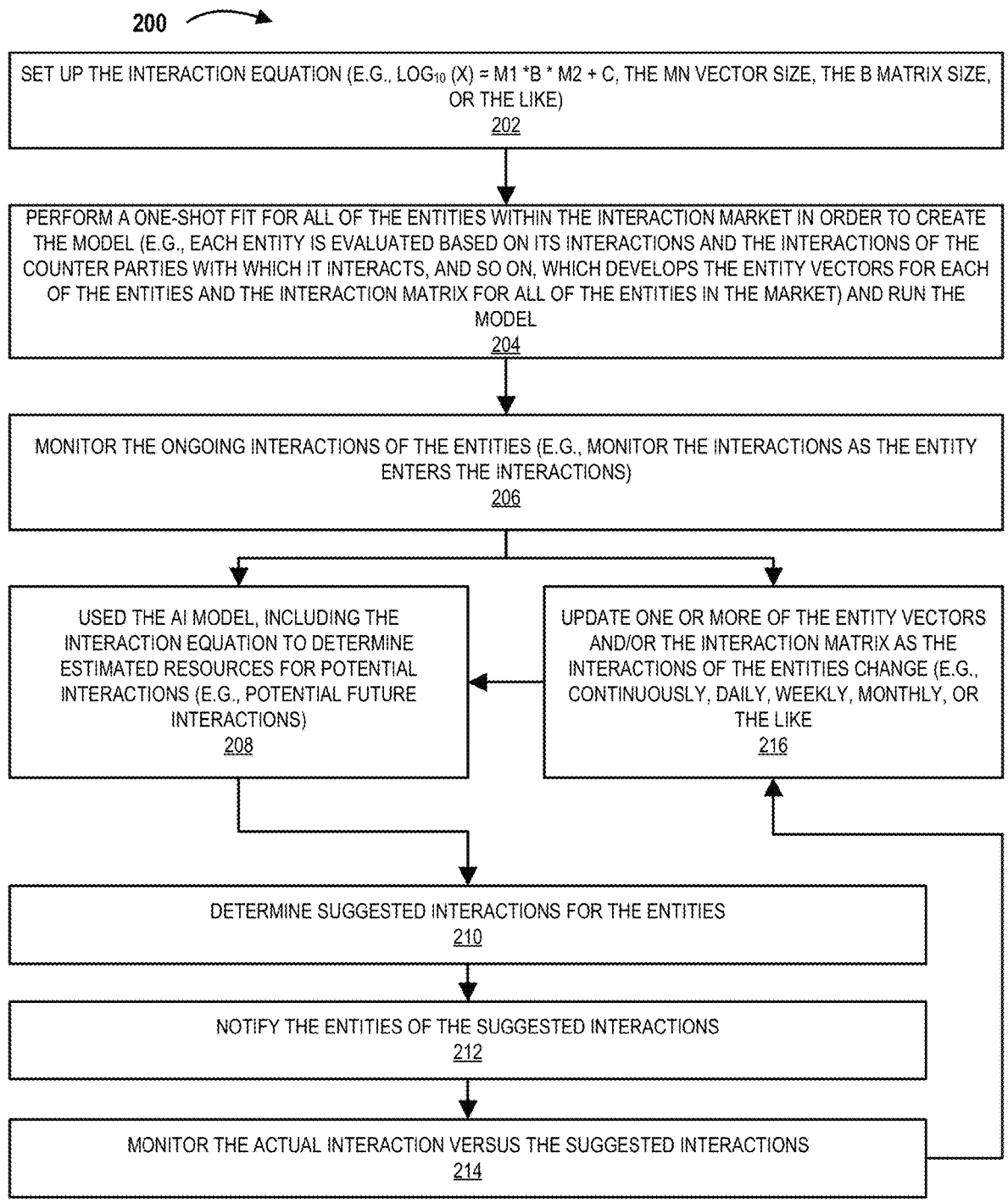

FIG. 3 illustrates an interaction prediction process flow for identifying suggested interactions, in accordance with one or more embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Systems, methods, and computer program products are herein disclosed for accurately predicting the occurrence of interactions, entities associated with the interactions, and/or resources involved with the interactions. It should be understood that the predictions can be used for a number of different purposes, such as but not limited to, improving security of systems, predicting future interactions or likelihood thereof, identifying potential entities that are misappropriators based on similar interactions, or the like. It should be understood that the improvements to the technical features of the systems relates to improving the processing speeds of the systems, reducing memory requirements, and increasing the processing capacity because the invention of the present disclosure reduces the amount of data and calculations needed to make the predictions when compared to traditional prediction systems and methods, as will be discussed in further detail herein. For example, the present disclosure illustrates that the systems, methods, and computer program products described herein determine the predicted interactions, entities, and/or resources more efficiently than traditional determinations, as will be discussed herein.

FIG. 1 illustrates an interaction predication system environment 1, in accordance with embodiments of the invention. As illustrated in FIG. 1, one or more organization systems 10 are operatively coupled, via a network 2, to one or more user computer systems 20, one or more interaction prediction systems 30, one or more third party systems 40, and/or one or more other systems (not illustrated). It should be understood that the interaction prediction system environment 1 allows for the occurrence of interactions between entities, such as for example, a first entity (e.g., a first user, a first third-party entity, such as a first merchant, or the like) and a second entity (e.g., a second user, a second third party entity, such as a second merchant, or the like). Moreover, the one or more interaction predication systems 30 may be utilized to predict interactions, entities, and/or resources associated with interactions.

It should be understood that the one or more organization systems 10 may be the systems that that facilitate interactions between entities. For example, the user entities and/or the third-party entities may enter into interactions and the organization may allow for the transfer of resources between the entities (e.g., the one or more organization systems 10 store and process interactions using resources from the resource pools managed by the organization). The users 4 (e.g., one or more associates, employees, agents, contractors, sub-contractors, third-party representatives, customers, or the like), may include customers, employees of the third-party entities, employees of the organization, or the like. The users 4 may use the user computer systems 20 to communicate with the other systems and devices (e.g., third-party systems 40) and/or components thereof. The one or more interaction predication systems 30 may be used by the organization, or the like, to model and monitor interactions in order to determine interaction verification, potential misappropriation, suggested interactions, or the like, as will be discussed in further detail herein. The third-party systems 40 may allow for the interactions with the users 4 (e.g., through interaction terminals, such as POS terminals, or other like systems).

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more interaction prediction systems 30, the one or more third party systems 40, and/or other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to operate the organization, which may be internal and/or external applications). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for operating the organization (e.g., the external and/or internal operation of the organization), such as by communicating (e.g., interacting with) the one or more user computer systems 20 and user applications 27, the one or more interaction predication system 30 and interaction prediction applications 37, the one or more third party systems 40 (and applications thereof), and/or other systems (not illustrated). It should be understood that the one or more organization applications 17 may comprise the applications that are used by the organization to control, monitor, deliver, transfer, or the like, the resources of its entities in response to interactions between entities (e.g., users and/or third party entities, or the like).

As further illustrated in FIG. 1, the one or more user computer systems 20 are operatively coupled, via a network 2, to the one or more organization systems 10, the one or more interaction prediction system 30, the one or more third party systems 40, and/or the one or more other systems. As illustrated in FIG. 1, users 4 may use the one or more user computer systems 20 and/or the one or more organization systems 10 to enter into interactions with the one or more third party systems 40 (directly or through users 4 and use computer systems 20 that are employees, representatives, agents, or the like of the third party), as will be described in further detail herein.

It should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, one or more memory components 26, and/or the one or more user applications 27, such as web browser applications, dedicated applications, specialized applications, or portions thereof. The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more interaction prediction systems 30, the one or more third party systems 40, and/or other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and/or the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to perform the actions described herein (e.g., enter into interactions, or the like).

As illustrated in FIG. 1, the one or more interaction predication systems 30 are operatively coupled, via a network 2, to the one or more organization systems 10, the one or more user computer systems 20, the one or more third party systems 40, and/or other systems. The one or more interaction prediction systems 30, as will be described in further detail herein, may be utilized to model and monitor interactions between the entities, as will be described herein. The one or more interaction predication system 30 may be utilized for more efficient modeling and monitoring of interactions. It should be understood that the one or more resource prediction systems 30 may be a part of, and thus controlled by, the organization.

The interaction prediction systems 30 generally comprise one or more communication components 32, one or more processor components 34, and one or more memory components 36. The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, the one or more third party systems 40, and/or the one or more other systems (not illustrated). As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more interaction prediction systems 30 may have computer-readable instructions 38 stored in the one or more memory components 36, which in some embodiments includes the computer-readable instructions 38 of one or more interaction prediction applications 37 that models, monitors, and/or allows the users 4, or other entities, to enter into interactions with the third parties or other entities using the user computer systems 20 or other physical resource tools (e.g., directly with the third parties and/or through the one or more organization systems 10, or the like), as will be described herein.

Moreover, the one or more third party systems 40 and/or the one or more other systems may be operatively coupled to and communicate with the one or more organization systems 10, the one or more user computer systems 20, and/or the one or more interaction prediction systems 30, through the network 2. The one or more third party systems 40 and/or the one or more other systems may have the same or similar components as the one or more organization systems 10, the one or more user computer systems 20, and/or the one or more interaction prediction systems 30 (e.g., communication component, processor component, memory component—computer readable instructions for applications, datastore). As such, the one or more third party systems 40 and/or the one or more other systems may communicate with the one or more organization systems 10, the one or more user computer systems 20, the one or more interaction prediction systems 30, and/or each other in the same or similar way as previously described with respect to the one or more organization systems 10, the one or more user computer systems 20, and/or the one or more interaction prediction systems 30.

It should be understood that the one or more third party systems 40 may comprise any type of device or component thereof, such as a desktop, mobile device (e.g., laptop, smartphone device, PDA, tablet, watch, wearable device, or other mobile device), server, wireless device, geo-fenced device, beacon, or any other type of system hardware, or combination thereof, through which an interaction may occur. As such, it should be understood that the one or more third party systems 40 may facilitate the interactions with the other entities. For example, the third parties may be merchants that provide a product (e.g., goods or services) to users during an interaction, and collect resources through the one or more organization systems 10. It should be understood that the user 4 and/or the third party may have resource pools (e.g., accounts, or the like) with the organization. The one or more other systems may be intermediaries, or the like, that allow for communication between the other systems and/or components thereof, described herein.

It should be understood that the improvements to the technical features of the systems relate at least to improving security and prediction of future interactions. For example, the present disclose illustrates the systems, methods, and computer program products to determine the predicted interactions, entities, and/or resources more efficiently than traditional determinations. That is, as will be described herein, the modeling and monitoring discussed herein increases the processing speeds, improves the memory requirements, and increases the capacity of the processing systems when compared to traditional systems, methods, and computer program products.

The present disclosure describes each entity (e.g., a user—such as a customer, and a third-party entity—such as a merchant) involved in an interaction (e.g., transactions within a market) using vectors. For example, each party is described by a vector, $\vec{m}_n$. The $\vec{m}_n$ vector may be a 7×1, 8×1, or other like vector, which includes numbers (1-7, 1-8, other integers, fractions of integers, or other like value), or the like. It should be understood that for entities that have entered into the exact same interactions (e.g., the exact same transactions, using the exact same resources, at the exact same time, at the exact same location) would have the same $\vec{m}_n$ vector. Alternatively, it is possible for entities that have different interactions to have the same $\vec{m}_n$ vector, but only if, the interactions in which the entities participate define the entity in the same way. In some embodiments of the invention, the $\vec{m}_n$ vector may define the entity's purposes for entering into interactions. For example, each entity that enters into an interaction may do so for a specific purpose. The purpose that an entity may enter into an interaction may include hunger, companionship, shelter, entertainment, luxury, time, education, economic, health, or any other like purpose for an interaction. Moreover, a single interaction in which a user enters may include multiple purposes. For example, making a purchase at a fast food restaurant may be a result of combination of purposes of hunger, economic, time, or the like, but not for the purposes of health, luxury, or the like. As such, by reviewing the interactions of entities over time, normalized $\vec{m}_n$ vectors may be determined for an appropriate sample size of entities that define the interactions in which the entities enter. The $\vec{m}_n$ vectors, and thus, the model in general may be defined with only a limited amount of information for each interaction, such as, an entity, a counter entity, and the resources (e.g., interaction amount) for the interaction. As will be discussed herein only this information is needed in order to accurately predict interactions of the entities.

It should be understood, that the $\vec{m}_n$ vectors are defined not only based on the interactions in which the individual entity participates, but also all of the interactions of all of the entities within a sample size. That is, the $\vec{m}_n$ vectors are relative indications of each entity's interactions with respect to all of the counter entities' interactions with other entities, and so on. Consequently, in order to identify the $\vec{m}_n$ vectors for a plurality of entities the system reviews the interactions of all of the entities over a period of time (e.g., weeks, months, years, or the like). It should be understood that the present disclosure defines the $\vec{m}_n$ vectors for each of the entities, including users associated with the organization (e.g., customers), as well as counter entities in the interactions (e.g., merchant), using 7×1, 8×1, or other like vectors that may represent the purposes for which the entities enter interactions.

The present disclosure uses the $\vec{m}_n$ vectors to estimate the resources for an interaction between entities (e.g., amount involved in a transaction between a user and a merchant) through an equation, that is, $\log_{10}(\$)=m1*B*m2+c$. The log in the equation may be the log base ten (10) or the natural log function, or the like. It should be understood that as used herein "$\log_y$," may represent any log function, including log base ten (10), the natural log function, or the like. The $\vec{m}_1$ component of the equation is the vector for a first entity in the interaction, and the $\vec{m}_2$ component of the equation is the vector for a second entity in the interaction. The B component of the equation is an interaction matrix (e.g., interaction market matrix), which describes the market in which the entities are interacting. It should be understood that the interaction matrix may be described as defining a market exchange rate for the interaction between any of the entities that interact within a defined market. It should be understood that the B interaction matrix may define asymmetric interaction, such that and interaction of a user 4 and a second entity may be different than how the user 4 interacts with a third entity. The market, and thus, the interaction matrix may be defined in a number of different ways, such as, a particular local market (e.g., a city, state), a regional market (e.g., group of states, or parts thereof), a country market (e.g., United States, or the like), regional world market (e.g., North America, or the like). It should be understood that the interaction matrix is the same for each of the entities within the market over specific time periods; however, the interaction market may change over time should the market in general change over time. For example, the interaction matrix may be different during times of recession when compared to times of economic expansion. Moreover, it should be understood that the interaction matrix may be required to be different in different locations and during different times in order to accurately define different interaction markets. It may be further understood that while the interaction market may be the same for a period of time and particular location, it may change over time as the market in which the entities interact changes. The interaction matrix may be a 7×7, 8×8, or other like matrix. It should be understood that a 7×7 or 8×8 matrix has been identified as being able to accurately predict a market. Moreover, the B interaction market matrix may be different based on different channels through which the entities are interacting. As such, the B interaction matrix may be limited to a single channel (e.g., credit card, debit card, or the like) or may be the result of multiple channels (e.g., interactions made over different types of channels represented in a single matrix).

The system may perform a one-shot fit using data to establish the initial vectors and the market interaction matrix. During the one-shot fit the vectors and the matrix are determined for the entities within a particular market. The one-shot fit includes capturing information regarding past interactions. For example, the interactions between a first entity and a second entity may be identified, and the average resources (e.g., interaction amount) for each interaction may be calculated. This may be done for each interaction and each entity within the market. Moreover, the vectors for each entity for the one-shot fit be populated for using a Gaussian Distribution. As such, in some embodiments the vectors are randomly populated using normalized values, which makes it easier for the model to run accurately (e.g., the model runs best when it is initially provided a normalized vectors). It should also be understood that normalized values may be used for the interaction matrix. The model is run based on the past interactions over time in order to determine the vectors for the entities and the interaction matrix for the market. The model then learns based on the interactions within the market using only the first entity, the second entity, and the resources for each interaction. The model understands that should a first entity likely spend a particular amount with an entity, the user will likely spend around the same amount with that entity and/or will likely spend the same amount with a similar entity. After the model is run for the past interactions, the vectors for the entity and the interaction matrix is defined for future use.

Once the model is created based on the past interactions, it can be used going forward with filtering (e.g., RLS, LMS, QRD-LSL, or other like linear adaptive filters, or other filtering) to determine the estimated interaction resources for interactions. The estimated interactions may be used for various purposes, such as in order to detect interactions that may be based on misappropriation of a resource pool (e.g., account, or the like) of the user 4, determining suggested interactions to present to the user 4, determining potential entities that are involved in misappropriation, determining potential entities that are involved in illegal activities (e.g., terrorism), or the like. For example, implementation of the model will be discussed in further detail with respect to FIG. 3.

It should be understood that the present invention is an improvement over other modeling systems because the 7×1, 8×1, or other like $\vec{m}_n$ vectors and the 7×7, 8×8, or other like dimensional interaction matrix are able to accurately estimate the resources associated with interactions between entities within a market, while at the same time reducing the processing capacity and data required by traditional models. For example, the traditional models may use 600, 300, or other like dimensions to make a similar determination; however, the processing capacity and speed needed run the model using the 600, 300, or other like dimensions is much more than the processing capacity and speed needed in order to run a 7 or 8 dimensional model of the present disclosure. Additionally, the model of the present disclosure found that for the $\vec{m}_n$ vectors, 5×1 and 6×1 vectors did not accurately predict the resources associated with interactions, and the 9×1 and 10×1 vectors resulted in too much noise. Consequently, the 7×1 or 8×1 matrices for the $\vec{m}_n$ vectors were identified as the ideal vectors in order to determine the estimated resources for interactions while reducing processing capacity requirements and increasing processing speeds. It should be understood that it may be desirable to reduce the vector size (e.g., to 6×1, 5×1, or the like) and/or matrix size (e.g., 6×6, 5×5, or the like) in order to reduce processing capacity requirements and increase process speeds without sacrificing accuracy, or without detrimentally sacrificing accuracy. As such, it should be understood that different size vectors (e.g, 7×1, 8×1, or the like) and/or dimensional matrices (e.g., 7 or 8 dimensional matrices, or the like) may be used for the model depending on system requirements, accuracy, noise, and/or the like.

It should be understood that in order to implement the model in practice, a test may be performed in order to determine the accuracy of the model. That is, the model may be run for known past misappropriation of a resource pool of a test entity. For example, the model is run for sequential interactions of a user, using a recursive least squares (RLS) filtering, or other filtering such as, least mean squares (LMS), QR-decomposition-based leas-squares lattice or recursive lease squares lattice (QRD-LSL or QRD-RLS), or any other type of filtering techniques, and any anomalies identified by the model can be compared against known misappropriated interactions for the same time period to determine the accuracy of the model. Different models using different $\vec{m}_n$ vectors and/or B matrices (different dimensions) were tested in order to determine the most efficient and accurate interaction predictions. For example, interactions were tested that included authorized interactions and unauthorized interactions. After creating the vectors and interaction matrix for the entities, sequential interactions were examined using the RLS filtering. The RLS filtering determined that the 7 or 8 dimensional models correctly predicted the resources involved in an interaction 50% of the time within 2% of the actual resources (e.g., within 2% of the actual transaction amount), and 95% of the time within 5% of the actual resources (e.g., within 5% of the actual transaction amount). The outcomes were much less accurate when 6×1, 7×1, 9×1, and/or 10×1 dimensional vectors were used. It should be understood that other types of filtering techniques, which may or may not be described herein, may be utilized in order to find similar results.

FIG. 2 illustrates a flow diagram regarding how the interaction prediction system may operate in some embodiments of the invention. The one or more interaction predication systems 30 may include an AI system 100 (e.g., artificial intelligence and/or machine learning system, or the like). The AI system 100 may comprise an interaction prediction AI model 110, an input module 120, a general-purpose computing on graphics processing unit (GPGPU) 130, an AI database 140, integration module 150, and/or a reporting module 160. The AI system 100 may also interact with the interaction modules 170 as well as a non-relational information modules 180. It should be understood that the interaction prediction AI model 110 comprises the equation, the vectors, the interaction matrix, and the RLS filtering or other filtering that is used to predict the resources of interactions. The interaction prediction AI model 110 receives interaction information over time, learns how interactions change the vectors and/or market matrix of a plurality of entities over time, updates the vectors and/or market matrix of the plurality of entities over time, and updates the prediction of interactions based on the updated vectors and/or market matrix. It should be understood that the interaction prediction AI model 110 provides a practical way of capturing the purpose of interactions of entities and using this information to predict individual interactions resources and characteristics.

The input module 120 receives interaction information from the one or more interaction modules 170. The interaction information may relate to the interactions in which the entities within the interaction market undertake. This may include historical interactions that are used to determine the vectors and the interaction matrix or ongoing interactions that the interaction prediction AI model 110 uses in order to determine the estimated resources for interactions. Moreover, the input module 120 receives non-relational information from the non-relational database 180. The non-relational information may comprise interaction information and/or entity information that is too large to reference with other information. The interaction predication AI model 110 receives the interaction information from the input module 120. The GPGPU 130 determines the vectors for the entities and the interaction matrix within the specified market, as well as the constraints, based on either the one-shot fit for the entities or the ongoing determinations based on the ongoing interactions. Moreover, the interaction predication AI model 110 utilizes the RLS filter or other filters, calculates the derivatives, and provides the information to the GPGPU 130 for further updating of the vectors of the entities. The determination of the interaction resources, entities, or the like may be stored in the AI database 140. The determination of the interaction resources, entities, or the like may be provided to other systems through the integration module 150 for various purposes (e.g., to the security systems of the organization to identify misappropriated resource pools of the user 4, to offer systems for providing suggested interactions to users 4, or the like). For example, the integration systems 150 may utilize the interaction resource predictions to determine potential misappropriation of an entity resource pool. In other examples the interaction resource predications may be used to determine suggested interactions for the entities. Moreover, the results of the interaction predication AI model 110 may be sent for reporting 160 to the organization, the entities, or the like.

FIG. 3 illustrates a process flow for identifying suggested interactions for an entity based on a prediction of future interactions for the entity using past interactions, in accordance with embodiments of the invention. Block 202 of FIG. 3 illustrates that the interaction equation, the $\vec{m}_n$ vectors of the entities, the B interaction matrix are set up for a plurality of entities as previously described herein. Setting up the equation, the entity vectors, and the interaction matrix includes determining location, time period, and entities to include in the interaction predication system, as well as the size of the vectors and interaction matrix. Moreover, the equation, the entity vectors, and the interaction matrix are set-up within the interaction prediction AI model 110 within the AI system 100.

Block 204 of FIG. 3 illustrates that the interaction predication system preforms a one-shot fit for all of the entities within the interaction market. The one-shot fit may be needed in order to create the starting point for the model. The one-shot fit may evaluate each entity defined in block 202 based on each entity's interactions and the interactions of the counter entities with which each entity interacts (and so on). This one-shot fit develops the entity vectors for each of the entities and the interaction matrix for the market of entities. The model may be run for past interactions in order to allow the model to become more accurate and/or the model may be updated based on ongoing interactions in the future. It should be understood that in some embodiments about a year of interactions may be needed in order to improve the model to achieve accurate results (e.g., to determine accurate vectors and/or an accurate interaction matrix). As such, in some embodiments the model may be based on a range of interactions that occur between 1, 2, 3, 4, 5, 6, 7, 8, 9, 10, 11, 12, 13, 14, 15, 16, 17, 18, 19, 20, 21, 22, 23, 24, 26, 28, 30, 35, 40, 45, 50, 55, or 60 months, or another range of interactions that may fall within, outside, or overlap these values.

Block 206 of FIG. 3, further illustrates that the interactions of the entities are monitored on an ongoing basis. For example, as an entity enters into an interaction, the interaction prediction system may capture actual interaction information or otherwise receive actual interaction information from the organization systems (or other systems). This may include monitoring interactions in real-time (e.g., instantaneously, or near instantaneously) before interactions are allowed, and/or after the interactions occur in order to identify potential anomalies.

Block 208 of FIG. 3 illustrates that a determination is made of potential interactions for the entities. Based on the monitoring of the interactions from block 206, potential interactions for entities may be identified (e.g., additional interactions with the counter entities with which the first entity interacts and/or other counter entities with which the first entity may interact). The interaction prediction system 30 may select an entity (e.g., user 4, merchant or the like) for which one or more potential offers may be determined. For example, the organization and/or third party system may want to identify offers that it may provide to users 4 that the users 4 would be likely to enter. As such, the interaction prediction AI model 110 may be utilized to determine estimated resources (or the likelihood of the interaction based on a normalized value using the RLS filtering or other filters) for an interaction should a user 4 enter into an interaction with a particular merchant and/or determine estimated resources (or the normalized value) should a merchant want to enter into an interaction with a particular user 4. For example, the interaction prediction AI model 110 may be utilized in order to determine potential interactions by determining estimated resources for interactions in which a merchant may enter with a plurality of potential users 4 within a market, or may determine estimated resources for interactions in which a user 4 may enter with a plurality of potential merchants. As such, the equation, vectors, interaction matrix, and/or RLS filtering or other filtering may be utilized in order to match up various users 4 and merchants in order to determine what interactions are likely to occur and/or at what resource amount such interactions are likely to occur (e.g., based on when a normalized value becomes in range of the entities other interactions). For example, should a first user typically interact with a first merchant, which results in interactions that may have a first resource amount, the first user may be substituted with a second user in order to determine how likely the second user would be to enter into an interaction with the first merchant (at the same resource amount or at a different resource amount). Depending on the estimated resource amount (or a normalized value) for the interaction between the second user and the first merchant, the first merchant may decide to present an offer to the second user to enter into an interaction. The offer may include a simple notification if the second user is likely to interact with the first merchant at a desired resource amount of the first merchant. Alternatively, if the interaction prediction AI model 110 determines that the interaction resource amount at which the second user would interact with the first merchant is lower than the amount of a product that the first merchant provides, than the first merchant may provide an offer to the second user that discounts the amount of the product to an amount at which the second user would be likely enter into the interaction. In another example, the first merchant may be substituted with a second merchant, but the first user may stay the same. The interaction prediction AI model 110 may determine an estimated interaction resource amount at which the first user would be likely to interact with the second merchant. It should be understood that any combination of entities within the market may be evaluated based, at least in part, on interactions that the users 4 and/or merchants may want to enter (e.g., the users and merchants may specifically show interest in a particular interaction the counter parties). For example, a merchant may request that the organization identify all of the users 4 that may be interested in an interaction with the merchant and/or with the merchant at a particular resource amount. Alternatively, the users 4 may indicate to the organization the merchants in which the users 4 are interested in entering interactions. In response, the interaction prediction system 30 may identify all of the potential entities (e.g., merchants and/or users 4) that may enter into an interaction at a particular interaction resource amount and/or the resource amounts at which the entities would likely enter into interactions.

Block 210 of FIG. 3, illustrates that based on all of the potential interactions identified from block 208, the interaction prediction system identifies suggested interactions for entities within the market. For example, the suggested interactions may be determined based on meeting specific requirements from entities within the market (e.g., all interactions that meet specific requests for interactions with specific merchants and/or at specific resource amounts). For example, returning to the example from block 208, the second merchant may decide to provide a notification to the first user with an offer for product either at the normal resource amount, or at a discount, depending on the estimated resource amount at which the first user would likely enter into an interaction as determined by the interaction prediction AI model 110 within block 208. As such, it should be understood that the interaction prediction system 30 may be utilized to test different combinations of users, merchants, or other entities in order to determine the most likely interactions for the entities, and in response, determine suggested interactions for the users and/or merchants that will result in the most likely adoption.

As illustrated by block 212 in FIG. 3, the interaction prediction systems 30 may send notifications of the suggested interactions to the entities within the market. For example, the notifications of suggested interactions may be sent directly to the users 4 when the suggested interactions meet requirements associated with the organization and/or the counter entity. For example, organizations and/or counter entities may try to determine the best suggested interactions to present to customers, by setting automatic rules, which when met, result in automatic notifications to user. Alternatively, the suggested interactions may be grouped and/or sent to third-parties (e.g., the merchants), and the third-parties may decide how to best present the notifications to the users 4.

It should be understood that the notifications that are presented to the users 4, either automatically or through the merchant, may be presented in a number of different ways. For example, the notifications may include e-mails, text messages, app. pop-ups, banners, telephone calls, or any other type of notification. In additional examples, the suggested interactions may be presented to the user 4 through online applications, such as resource pool interfaces (e.g., online banking interfaces, transactions lists therein, or the like). For example, the suggested interactions may be provided alongside related actual interactions to illustrate to the users alternate interactions that the user 4 may enter the next time the user 4 would like to enter into an interaction. It should be understood that notifying the users 4 and/or entities of potential suggested interactions may require opt-in from the users 4 and/or entities to accept such suggested interactions.

FIG. 3 further illustrates in block 214, that the actual interactions are monitored in view of the suggested interactions. That is, for example, a user's interactions are monitored in order to determine if the user actually entered into a suggested interaction. This additional information may be helpful in determining specific entities that the user may or may not enter into interactions with regardless of whether not the interaction predication AI model 110 made the prediction. For example, the interactions of each user 4 may be monitored and compared will all the suggested interactions presented to the user 4 in order to determine if the user actually utilized the suggested interactions, as well as how long it took in order for the user to enter into the suggested interactions.

Block 216 of FIG. 3 further illustrates that the monitoring of the actual interactions (regardless of whether or not the interaction relates to the suggested interaction) may be utilized to update one or more of the entity vectors in order to account for changes in the purposes for which user's enter into interactions, such that the interaction prediction model 110 remains accurate in predicting potential interactions.

It should be understood that the present invention is an improvement over traditional modeling systems, because the present invention is more accurate than traditional prediction systems (e.g., accurately predicts interactions while minimizing noise). Specifically, traditional systems require much larger dimensional matrices and/or vectors that require the storage and transfer of much larger amounts of data (e.g., requires larger memory and/or the processing capacity), as well as increased processing speeds to make the calculations for each interaction and/or entity based on the larger vectors and/or matrices. Alternatively, the present invention uses only 7×1 or 8×1 vectors and a 7 or 8 dimensional interaction matrices (instead of 300 or 600 dimensional matrices, or other like matrices) to accurately predict the interactions.

It should be understood that the systems described herein may be configured to establish a communication link (e.g., electronic link, or the like) with each other in order to accomplish the steps of the processes described herein. The link may be an internal link within the same entity (e.g., within the same organization) or a link with the other systems. In some embodiments, the one or more systems may be configured for selectively responding to dynamic inquires. These feeds may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP)

packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| U.S. Patent Application Ser. No. | Title | Filed On |
| --- | --- | --- |
| 16/190,938 | ENTITY RECOGNITION SYSTEM BASED ON INTERACTION VECTORIZATION | Concurrently herewith |

What is claimed is:

1. An interaction prediction system for identifying suggested interactions, the system comprising:
one or more memory components having computer readable code stored thereon; and
one or more processing components operatively coupled to the one or more memory components, wherein the one or more processing components are configured to execute the computer readable code to:
identify a first entity and a second entity for a potential interaction, wherein the first entity is a customer user and the second entity is a merchant entity;
identify estimated interaction resources for the potential interaction based on an interaction equation, as follows:

$$\log_y(X) = \overline{m}1 * B * \overline{m}2 + c;$$

wherein $\overline{m}1$ is a first vector for the first entity and comprises a 7×1 or 8×1 vector that represents past interactions in which the first entity enters;
wherein $\overline{m}2$ is a second vector for the second entity and comprises a 7×1 or 8×1 vector that represents past interactions in which the second entity enters;
wherein B is a interaction matrix and comprises a 7×7 dimensional matrix when the first vector and the second vector are 7×1 vectors or an 8×8 dimensional matrix when the first vector and the second vector are 8×1 vectors, wherein the interaction matrix represents a market in which the first entity and the second entity are interacting, wherein the B interaction matrix is adjusted based on different locations of the market in which the first entity and the second entity are interacting or is adjusted based on time at which the first entity and the second entity are interacting;
wherein c is an interaction amount type constant; and
wherein X is the estimated interaction resources for an interaction;
determine a suggested interaction between the first entity and the second entity, wherein the suggest interaction is determined by an interaction prediction artificial intelligence (AI) model that updates the first vector, second vector, and the interaction matrix over time based on a plurality of actual interactions, and wherein the suggested interaction is determined by determining when resources for a product are less than or equal to the estimated interaction resources for the potential interaction; and
send a notification to the first entity or the second entity regarding the suggested interaction.

2. The system of claim 1, wherein a $\vec{m}_n$ vector is determined for each of a plurality of entities, including the first entity and the second entity.

3. The system of claim 2, wherein the $\vec{m}_n$ vector for each of the plurality of entities and the B interaction matrix is determined by using a one shot fit for the plurality of entities based on historical interactions for the plurality of entities.

4. The system of claim 2, wherein the $\vec{m}_n$ vector for at least one entity of the plurality of entities is updated as the at least one entity enters into new interactions.

5. The system of claim 2, wherein the B interaction matrix defines the market in which the plurality of entities are participants.

6. The system of claim 1, wherein the notification of the suggested interaction is displayed on a graphical user interface of the first entity in a resource pool interface.

7. The system of claim 1, wherein notification of the suggest interaction is grouped with suggested interactions determined for a plurality of customers using the interaction equation and sent to the second entity for distribution to the plurality of customers.

8. The system of claim 1, wherein the B interaction matrix is adjusted based on the different locations of the plurality of entities.

9. The system of claim 1, wherein the B interaction matrix is adjusted based on the time.

10. The system of claim 1, wherein the potential interaction is limited to channel.

11. The system of claim 1, wherein the estimated interaction resources indicate a resource amount at which the first entity would likely enter into an interaction with the second entity.

12. The system of claim 1, wherein the one or more processing components are further configured to execute the computer readable code to:
identify a plurality of entities for potential interactions with the second entity;
identify the estimated interaction resources for each of the potential interactions based on the interaction equation; and
determine a plurality of suggested interactions between the plurality of entities and the second entity when the estimated interaction resources for the plurality of suggested interactions meets thresholds resources for a product of the second entity;
wherein the notification is sent to the second entity and comprises the suggested interactions for the plurality of entities.

13. A computer implemented method for an interaction prediction system for identifying suggested interactions, the method comprising:
identifying, by one or more processing components, a first entity and a second entity for a potential interaction, wherein the first entity is a customer user and the second entity is a merchant entity;
identifying, by the one or more processing components, estimated interaction resources for the potential interaction based on an interaction equation, as follows:

$$\log_y(X) = \overline{m}1 * B * \overline{m}2 + c;$$

wherein $\overline{m}1$ is a first vector for the first entity and comprises a 7×1 or an 8×1 vector that represents past interactions in which the first entity enters;
wherein $\overline{m}2$ is a second vector for the second entity and comprises a 7×1 or 8×1 vector that represents past interactions in which the second entity enters;
wherein B is a interaction matrix and comprises a 7×7 dimensional matrix when the first vector and the second vector are 7×1 vectors or an 8×8 dimensional matrix when the first vector and the second vector are 8×1 vectors, wherein the interaction matrix represents a market in which the first entity and the second entity are interacting, wherein the B interaction matrix is adjusted based on different locations of the market in which the first entity and the second entity are interacting or is adjusted based on time at which the first entity and the second entity are interacting;
wherein c is an interaction amount type constant; and
wherein X is the estimated interaction resources for an interaction;
determining, by the one or more processing components, a suggested interaction between the first entity and the second entity, wherein the suggest interaction is determined by an interaction prediction artificial intelligence (AI) model that updates the first vector, second vector, and the interaction matrix over time based on a plurality of actual interactions, and wherein the suggested interaction is determined by determining when resources for a product are less than or equal to the estimated interaction resources for the potential interaction; and sending, by the one or more processing components, a notification to the first entity or the second entity regarding the suggested interaction.

14. The method of claim 13, wherein a $\vec{m}_n$ vector is determined for each of a plurality of entities, including the first entity and the second entity; and wherein the $\vec{m}_n$ vector for each of the plurality of entities and the B interaction matrix is determined by using a one shot fit for the plurality of entities based on historical interactions for the plurality of entities.

15. The method of claim 14, wherein the B interaction matrix defines the market in which the plurality of entities are participants.

16. The method of claim 13, wherein the estimated interaction resources indicate a resource amount at which the first entity would likely enter into an interaction with the second entity.

17. The method of claim 13, further comprising:
identifying, by the one or more processing components, a plurality of entities for potential interactions with the second entity;
identifying, by the one or more processing components, the estimated interaction resources for each of the potential interactions based on the interaction equation; and
determining, by the one or more processing components, a plurality of suggested interactions between the plurality of entities and the second entity when the estimated interaction resources for the plurality of suggested interactions meets thresholds resources for a product of the second entity;
wherein the notification is sent to the second entity and comprises the suggested interactions for the plurality of entities.

18. A computer program product for an interaction prediction system for identifying suggested interactions, the computer program product comprising at least one non-transitory computer-readable medium having computer-readable program code portions embodied therein, the computer-readable program code portions comprising:

an executable portion configured to identify a first entity and a second entity for a potential interaction, wherein the first entity is a customer user and the second entity is a merchant entity;

an executable portion configured to identifying estimated interaction resources for the potential interaction based on an interaction equation, as follows:

$$\log_y(X) = \overline{m}1 * B * \overline{m}2 + c;$$

wherein $\overline{m}1$ is a vector for the first entity and comprises a 7×1 or 8×1 vector that represents past interactions in which the first entity enters;
wherein $\overline{m}2$ is a vector for the second entity and comprises a 7×1 or 8×1 vector that represents past interactions in which the second entity enters;
wherein B is a interaction matrix and comprises a 7×7 dimensional matrix when the first vector and the second vector are 7×1 vectors or an 8×8 dimensional matrix when the first vector and the second vector are 8×1 vectors, wherein the interaction matrix represents a market in which the first entity and the second entity are interacting, wherein the B interaction matrix is adjusted based on different locations of the market in which the first entity and the second entity are interacting or is adjusted based on time at which the first entity and the second entity are interacting;
wherein c is an interaction amount type constant; and
wherein X is the estimated interaction resources for an interaction;

an executable portion configured to determine a suggested interaction between the first entity and the second entity, wherein the suggest interaction is determined by an interaction prediction artificial intelligence (AI) model that updates the first vector, second vector, and the interaction matrix over time based on a plurality of actual interactions, and wherein the suggested interaction is determined by determining when resources for a product are less than or equal to the estimated interaction resources for the potential interaction; and an executable portion configured to send a notification to the first entity or the second entity regarding the suggested interaction.

* * * * *